United States Patent [19]

Robson

[11] Patent Number: 5,308,507
[45] Date of Patent: May 3, 1994

[54] METHOD AND APPARATUS FOR REMOVING ORGANIC CONTAMINANTS

[75] Inventor: William M. Robson, Albuquerque, N. Mex.

[73] Assignee: Los Alamos Technical Associates, Inc., Albuquerque, N. Mex.

[21] Appl. No.: 924,739

[22] Filed: Aug. 4, 1992

[51] Int. Cl.$^5$ .............................................. C02F 1/46
[52] U.S. Cl. .................................. 210/748; 210/198.1; 210/758; 210/790; 210/908; 210/909; 204/131; 204/149; 204/275; 204/302
[58] Field of Search ...................... 210/758, 748, 198.1, 210/754, 759, 760, 790, 908, 909; 204/149, 130, 131, 151, 302, 275, 263, 98, 157.48, 157.5

[56] References Cited

U.S. PATENT DOCUMENTS

| | | | |
|---|---|---|---|
| 4,230,571 | 10/1980 | Dadd | 210/760 |
| 4,761,208 | 8/1988 | Gram et al. | 204/149 |
| 4,786,380 | 11/1988 | van Duin et al. | 204/149 |
| 4,839,007 | 6/1989 | Kötz et al. | 204/149 |
| 4,882,021 | 11/1989 | Barnhart | 204/158.2 |
| 5,032,239 | 7/1991 | Sweeney | 204/131 |
| 5,094,734 | 3/1992 | Torrado | 204/149 |

*Primary Examiner*—Neil M. McCarthy
*Attorney, Agent, or Firm*—McCubbrey, Bartels & Ward

[57] ABSTRACT

A method and apparatus for destroying organic compounds is described. The apparatus utilizes a mixture of oxidants to "burn" the organic compound. The oxidants can be generated in a separate apparatus and then added to the organic compound. If the organic compound is present in the form of an aqueous solution, the oxidants can be generated in the aqueous solution itself.

8 Claims, 5 Drawing Sheets

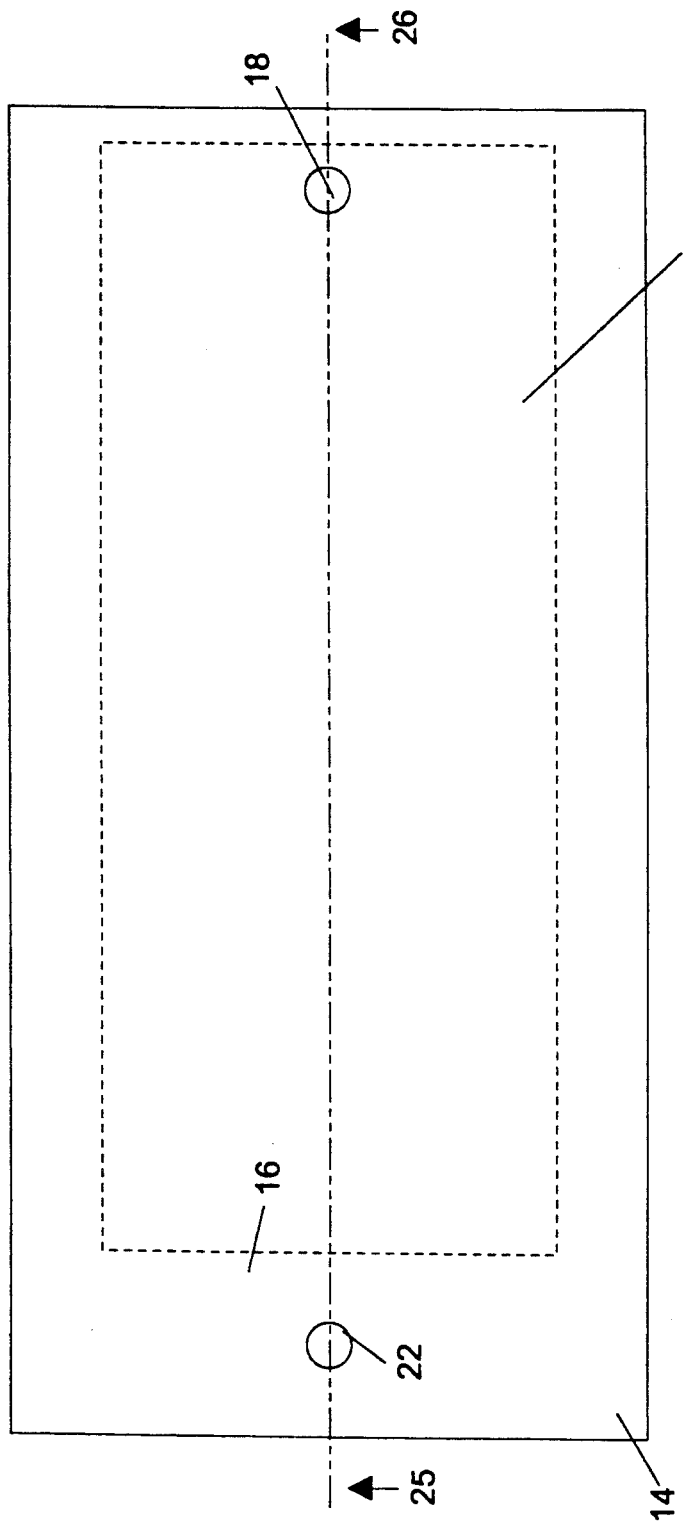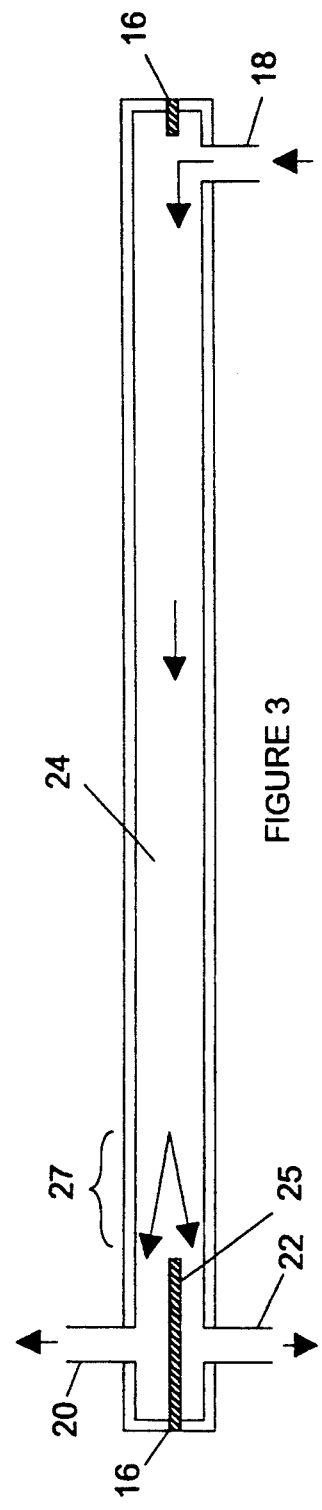

METHOD AND APPARATUS FOR REMOVING ORGANIC CONTAMINANTS

Field of the Invention

The present invention relates to waste treatment, and more particularly, to the destruction of organic wastes.

Background of the Invention

Contamination by toxic organic pollutants has become an increasingly important environmental problem. The contaminants often consist of low molecular weight organic compounds. Such contaminants are of concern both in terms of water and air pollution. These compounds are often found in trace concentrations and are not removed by conventional water treatment systems.

The compounds in question are generated by numerous industrial processes. Many of these compounds are manufacturing solvents. Even with the aid of solvent recovery systems, the concentration of these solvents in waste stream remains above acceptable levels and prevents the discharge of waste water streams containing the same into rivers and/or the ground.

Another common source of organic ground contamination are storage tanks for gasoline or other hydrocarbon fuels. In the United States alone, there are thousands of leaking gasoline tanks. The normal method for treating a leaking storage tank site is to remove the storage tank and the contaminated soil. The soil must then be transported to a hazardous waste site for decontamination or storage. Needless to say, it would be advantageous to provide a less costly solution to organically contaminated soil which did not require the transportation of the soil to a hazardous waste site.

Concentrated organic waste can be destroyed by incineration or steam reformation. Unfortunately, these systems perform poorly on dilute organic waste streams. If the dilute stream is treated directly, a large amount of heat must be wasted to vaporize the water. In the case of contaminated soil, large volumes of soil must be heated. In principle, dilute waste streams can be concentrated by filtration through activated charcoal. Activated carbon is highly porous and is capable of adsorbing many contaminants from both liquid and gas phases. The contaminated gas or liquid is typically passed through an activated carbon bed. The contaminants are then adsorbed by the activated carbon until the capacity of the bed is reached. At this point, the activated carbon must be regenerated. The regeneration process typically involves heating the carbon to extremely high temperatures at high pressures. The regeneration separates the contaminants from the carbon, but does not destroy all of the contaminants. In addition, the carbon beds lose a significant fraction of their capacity with each regeneration cycle.

An alternative method for regenerating the activated carbon involves steam reformation. In these systems, the contaminants are removed from the charcoal by high temperature steam which also destroys the contaminants. Unfortunately, the equipment and energy costs of such systems are often prohibitive. In addition, the systems must be "tuned" for the specific waste streams.

Broadly, it is the object of the present invention to provide an improved organic waste treatment system.

It is yet another object of the present invention to provide a waste treatment system which may be used to treat dilute organic waste streams without the need to concentrate these streams using activated charcoal.

It is a still further object of the present invention to provide a waste treatment system that requires less energy than prior art systems.

These and other objects of the present invention will become apparent to those skilled in the art from the following detailed description of the invention and the accompanying drawings.

SUMMARY OF THE INVENTION

The present invention encompasses an apparatus and method for destroying organic compounds. The present invention utilizes mixed oxidants that are generated in a simple electrolytic cell to burn the organic compounds. In one embodiment of the present invention, the oxidants are first generated in the electrolytic cell by passing a salt solution to the cell and collecting the anode stream from the cell. The oxidants are then added to the organic compounds. In a second embodiment, salt is added to a waste stream containing an organic contaminant. The waste stream is then passed through an electrolytic cell resulting in the production of oxidants in the waste stream and the subsequent destruction of the organic compound.

BRIEF DESCRIPTION OF THE DRAWINGS

FIG. 2 is a side view of an electrolytic cell according to the present invention.

FIG. 3 is a cross-sectional view of an electrolytic cell according to the present invention.

DETAILED DESCRIPTION OF THE INVENTION

The present invention utilizes an oxidizing solution to "burn" the organic compounds in solution. The oxidizing solution is generated in a simple electrolytic cell.

Mixed oxidant generating systems based on the electrolytic production of chlorine and ozone based agents are known to the prior art. These systems require only electricity and common salt as raw materials. One such system is described in U.S. Pat. No. 4,761,208 to Gram, et al. which is incorporated herein by reference. This system utilizes an electrolytic cell to generate a mixed stream of oxidants including chlorine compounds, ozone, and $H_2O_2$ from common salt. The oxidant stream was originally developed as a sterilizing agent for use in treating drinking water. This system is particularly attractive because of its simplicity and long maintenance free operation time.

Figure 1:
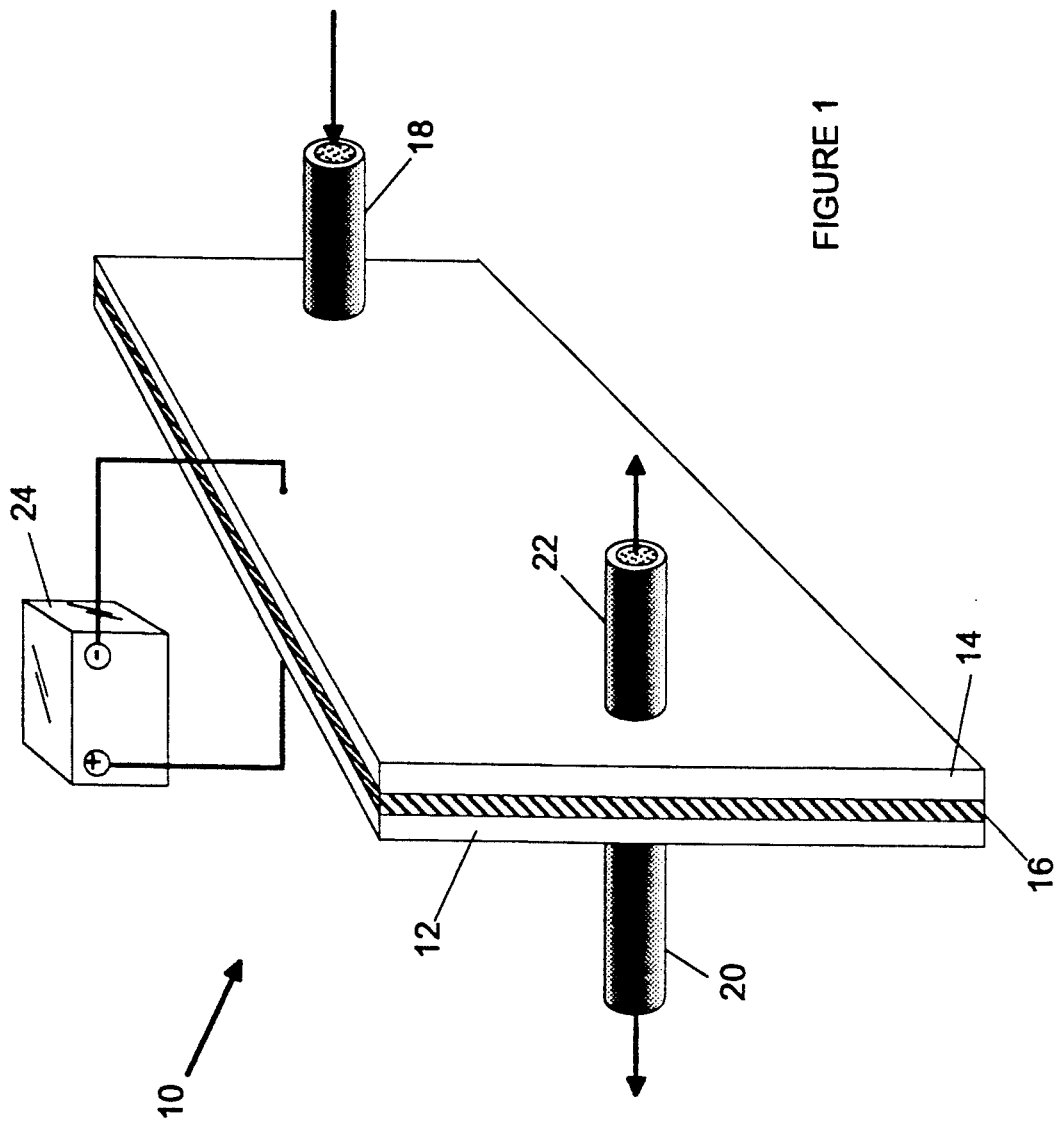
FIG. 1 is a prospective view of an electrolytic cell according to the present invention.

The present invention utilizes a similar electrolytic cell to generate a mixed oxidant stream. The manner in which an electrolytic cell 10 according to the present invention operates can be more easily understood with reference to FIGS. 1-3. Electrolytic cell 10 includes an anode 12 and a cathode 14 which are separated by an insulating gasket 16 thereby forming a flow chamber 24 through which a salt solution is passed. The salt solution is introduced through an input port 18 and exits through an anode port 20 and a cathode port 22. A DC voltage is maintained between anode 12 and cathode 14 with the aid of a power source 24. Anode 12 and cathode 14 are preferably constructed from titanium. In addition, anode 12 preferably includes a Group VIII metal.

Referring to FIG. 3, the flow of salt solution is divided by an extension of gasket 25 into anode and cathode output streams which exit through anode port 20 and cathode port 22, respectively. The flow in chamber 24 is laminar in nature. As the salt solution traverse the chamber 24, the pH of the solution changes. The portion of the salt solution that is adjacent to anode 12 decreases in pH, while the portion of the salt solution that is adjacent to cathode 14 increases in pH.

Various oxidants are generated in the salt solution as the solution progresses through the electrolytic cell. The solution leaving anode port includes ozone and various chlorine containing oxidants. This solution will be referred to as the anode stream in the following discussion. The solution leaving the cathode port will be referred to as the cathode stream. The division of the input stream from input port 18 into the anode and cathode streams is aided by an extension of gasket 16 which forms a flow separator 25.

The anode stream is added to the water supply containing the organic contaminant. The anode stream is preferred because it contains higher concentrations of desired oxidants and because it has an acidic pH. In addition, the germicidal effects of the mixed oxidants are increased in acidic environments; hence, if the waste stream is also contaminated with bacteria, the addition of the anode stream will kill the bacteria in question.

Figure 4:
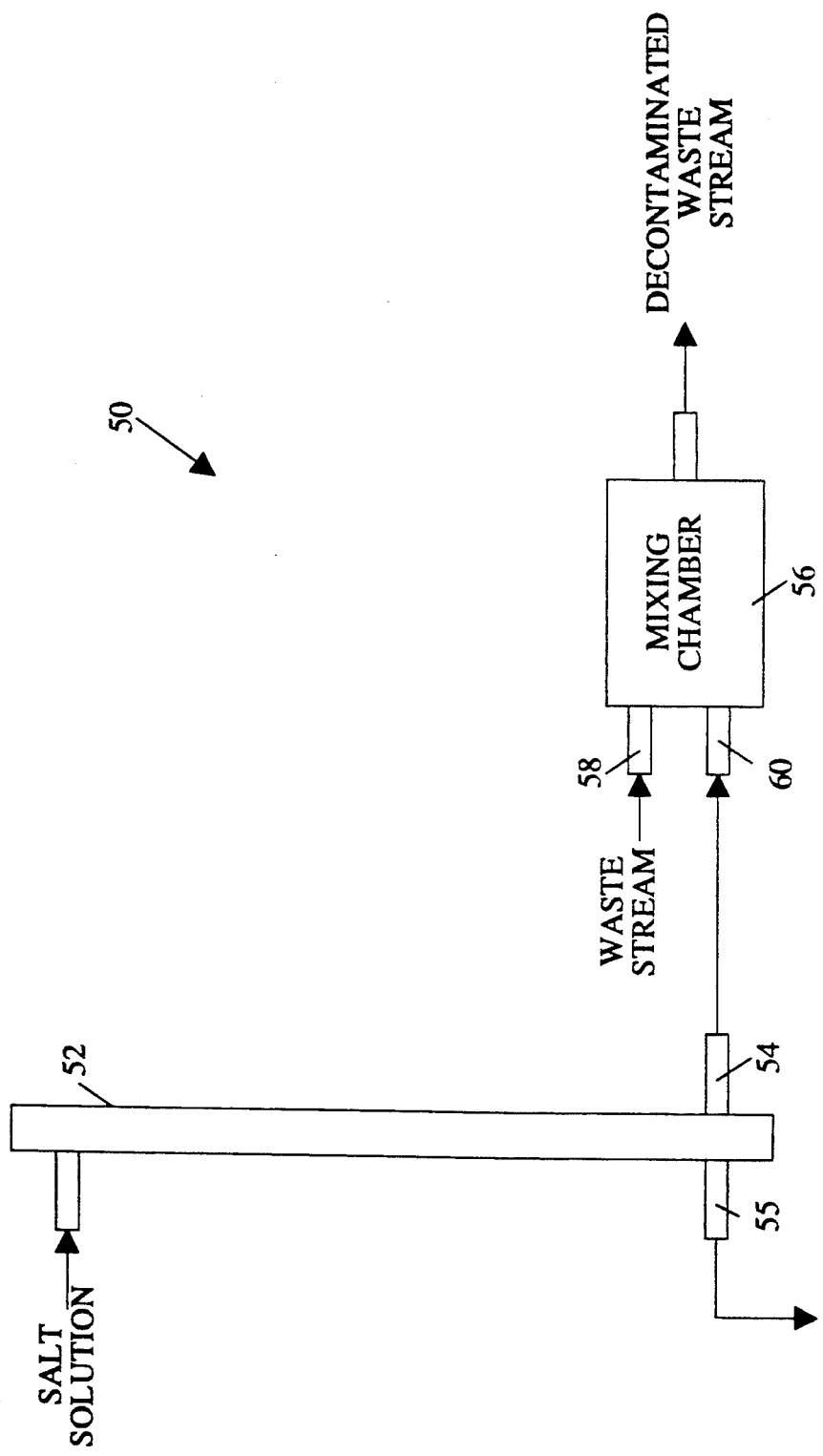
FIG. 4 is a block diagram of one embodiment of an apparatus for destroying contaminants in a waste stream.

In one embodiment of the present invention, the anode stream is added directly to the contaminated waste stream in equal volumes as shown in FIG. 4 at 50. The salt solution is introduced into an electrolytic cell 52 according to the present invention. The anode stream 54 is input to the first port 60 of a mixing chamber 56. The cathode stream 55 is discarded in this embodiment of the present invention. The waste stream to be treated is introduced through a second port 58 of mixing chamber 56.

The embodiment shown in FIG. 4 has been tested on six organic contaminants commonly found in hazardous waste sites, Carbon Tetrachloride, Dioctylphthalate, Isooctane, Naphthalene, Pentachlorophenol, and Trichloroethylene. The contaminants were introduced in an aqueous waste stream at concentrations of 17 to 36 mg per liter. The waste stream was mixed with an equal volume of ozone containing effluent from the anode stream. The ozone concentration in the anode stream was approximately 11 mg per liter. The Isooctane, Naphthalene, and Pentachlorophenol contaminated streams were decontaminated to better than 98%. The Carbon Tetrachloride, Dioctylphthalate, and Trichloroethylene contaminated streams were decontaminated to a lesser extent, 77%, 25%, and 55%, respectively.

To improve the rate of destruction of more resistant contaminants, a UV light may be added to mixing chamber 56. For example, the inclusion of an 18 watt UV light in a quartz sheath to a two liter mixing chamber improved the destruction of the Trichloroethylene contaminated stream from 55% to 99%. The exposure to UV was approximately 30 seconds.

While the effectiveness of the present invention on all of the contaminants was not sufficient to completely treat waste streams including the more resistant contaminants, the present invention provides a significant reduction in the contaminant concentrations. This reduction is accomplished at a cost which is substantially below that of other treatments. The energy needed to generate one gallon of anode stream is a few watt-hours. Hence, a net savings is achieved even in systems in which the decontaminated stream leaving the present invention must be subsequently treated via activated charcoal or similar treatments.

Figure 5:
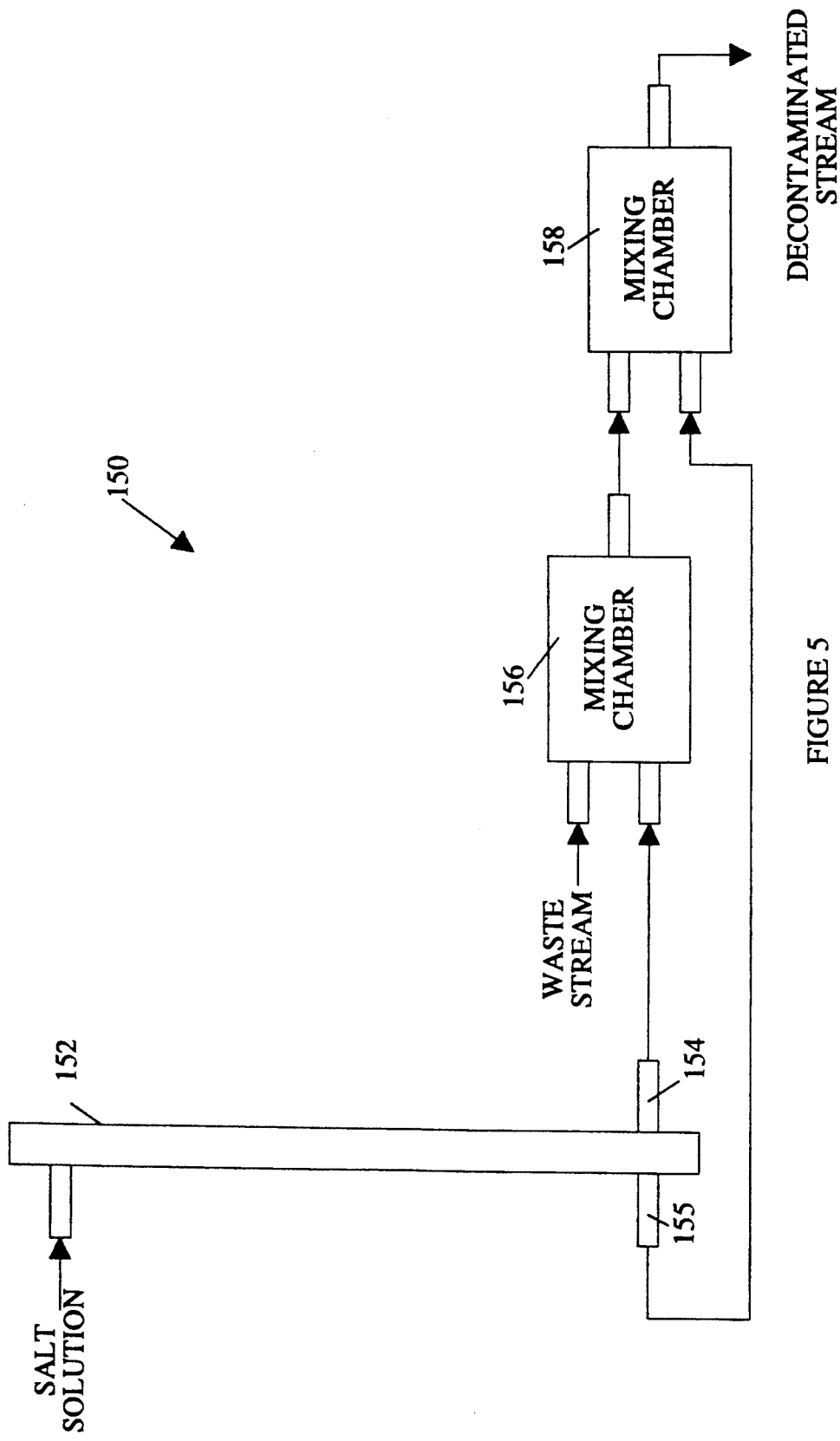
FIG. 5 is a block diagram of a second embodiment of an apparatus for destroying contaminants in a waste stream.

While the above described embodiment of the present invention discarded the cathode stream, it will be apparent to those skilled in the art that the cathode stream may also be used. An embodiment of the present invention in which the cathode stream is also utilized is shown in FIG. 5 at 150. In this embodiment of the present invention, the anode stream 154 of an electrolytic cell 152 is mixed with the waste stream in a first mixing chamber 156. The cathode stream 155 is then mixed with the effluent from mixing chamber 156 in a second mixing chamber 158. In addition to providing additional oxidants for removing organics, the cathode stream neutralizes the output of mixing chamber 156 prior to discharge. In the absence of mixing chamber 158, the decontaminated stream would be acidic because of the acidic quality of the anode stream. It will be apparent to those skilled in the art that the order of mixing of the anode and cathode streams may be reversed in systems in which both streams are utilized.

Figure 6:
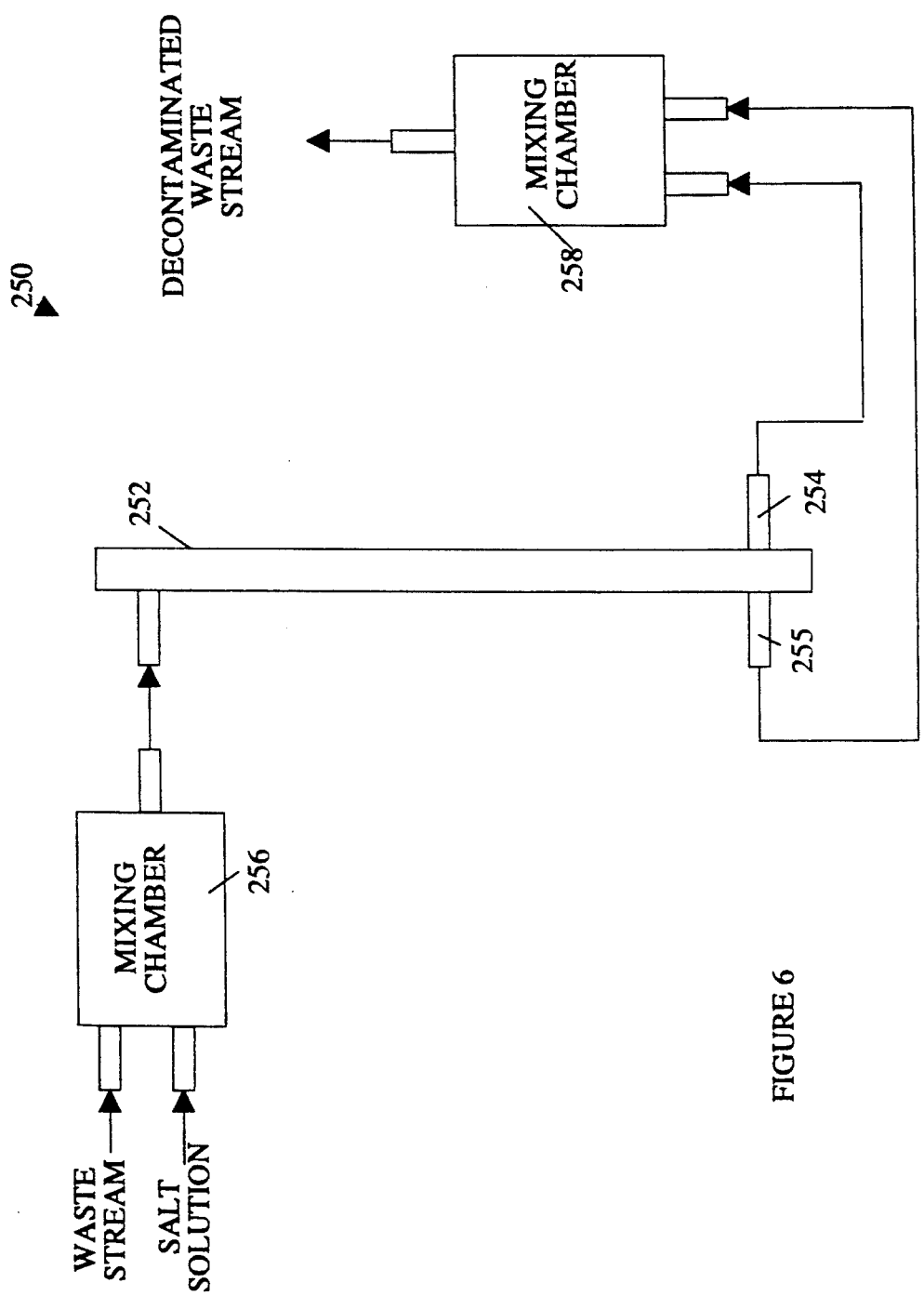
FIG. 6 is a block diagram of a third embodiment of an apparatus for destroying contaminants in a waste stream.

The above described embodiments of the present invention operate by generating the mixed oxidants from a salt solution and then combining the mixed oxidants with the waste stream. This approach protects the electrolytic cell from damage in situations in which the waste stream includes compounds that would either attack the anode coating in the electrolytic cell or foul the same. However, in many situations, the waste stream can be run directly through the electrolytic cell as shown in FIG. 6 at 250. In this embodiment of the present invention, the waste stream is mixed with sufficient salt to bring the salt concentration of the waste stream to the level needed to generate mixed oxidants in electrolytic cell 252. This mixing operation can be accomplished with the aid of a mixing chamber 256. As the waste stream passes through electrolytic cell 252, mixed oxidants are generated therein and react with the organic contaminants. The anode stream 254 and cathode stream 255 can then be combined in mixing chamber 258 prior to discharge. This embodiment of the present invention avoids diluting the mixed oxidant stream; hence, higher concentrations of organic materials may be removed.

It will be apparent to those skilled in the art that the function of mixing chamber 258 may be accomplished at the end of electrolytic cell 252 containing the anode and cathode ports 254 and 255. If these ports are replaced by a single port, the anode and cathode streams will be effectively mixed prior to exiting from electrolytic cell 252. It will also be apparent to those skilled in the art that a UV light source may be included in electrolytic cell 252.

While the present invention has been described in terms of mixing the anode stream with a dilute waste stream, it will be apparent to those skilled in the art that the anode stream may be added to soil to destroy contaminants contained therein. For example, the anode stream may be pumped into the ground in the vicinity of a fuel tank to destroy hydrocarbons that leaked into the ground. Such an arrangement has the additional advantage of not requiring the removal of the soil prior to treatment.

Accordingly, there has been described herein a method and apparatus for treating organic waste streams and the like. Various modifications to the present invention will become apparent to those skilled in the art from the foregoing description and accompanying drawings. Hence, the present invention is to be limited solely by the scope of the following claims.

What is claimed is:

1. A method for destroying an organic compound, said method comprising the steps of:
   generating an anode stream comprising a mixture of oxidants by passing a salt solution through an electrolytic cell comprising:
   anode means comprising a first surface;
   cathode means comprising a second surface, said second surface being parallel to said first surface;
   means for maintaining an electrical potential between said first and second surfaces;
   means for causing salt solution to flow between said first and second surfaces and to be subsequently divided into cathode and anode streams, said anode stream comprising the portion of said electrolytic solution that was caused to flow between said first and second surfaces adjacent to said first surface;
   mixing a portion of said anode stream or said cathode stream with said organic compound; and
   mixing a portion of the other of said anode stream of said cathode stream with said organic compound.

2. An apparatus for destroying an organic compound comprising:
   anode means comprising a first surface;
   cathode means comprising a second surface, said second surface being parallel to said first surface;
   means for maintaining an electrical potential between said first and second surfaces;
   means for causing an electrolytic solution to flow between said first and second surfaces and to be subsequently divided into cathode and anode streams, said anode stream comprising the portion of said electrolytic solution that was caused to flow between said first and second surfaces adjacent to said first surface; and
   means for mixing a portion of said anode stream with a waste stream comprising an organic compound selected from the group consisting of Carbon Tetrachloride, Dioctylphthalate, Isooctane, Naphthalene, Pentachlorophenol, or Trichloroethylene.

3. An apparatus for destroying an organic compound comprising:
   anode means comprising a first surface;
   cathode means comprising a second surface, said second surface being parallel to said first surface;
   means for maintaining an electrical potential between said first and second surfaces;
   means for causing an electrolytic solution to flow between said first and second surfaces and to be subsequently divided into cathode and anode streams, said anode stream comprising the portion of said electrolytic solution that was caused to flow between said first and second surfaces adjacent to said first surface;
   means for mixing a portion of said anode stream with said organic compound; and
   means for mixing said cathode stream with said organic compound.

4. The apparatus of claim 2 further comprising means for illuminating said organic compound with UV light after the mixing of said portion of said anode stream.

5. A method of destroying an organic compound in aqueous solution, said method comprising the steps of:
   raising the salt concentration of said aqueous solution to a predetermined concentration; and
   passing said aqueous solution through an electrolytic cell comprising;
   anode means comprising a first surface;
   cathode means comprising a second surface;
   means for maintaining an electrical potential between said first and second surfaces;
   means for causing said aqueous solution to flow between said first and second surfaces and to be divided into cathode and anode streams, said anode stream comprising the portion of said electrolytic solution that was caused to flow between said first and second surfaces adjacent to said first surface and said cathode stream comprising the portion of said electrolytic solution that was caused to flow between said first and second surfaces adjacent to said second surface; and
   combining said anode and cathode streams to form a treated waste stream.

6. An apparatus for treating an aqueous solution containing an organic contaminant so as to destroy said organic contaminant, said apparatus comprising:
   means for adjusting the salt concentration of said aqueous solution to a predetermined salt concentration; and
   electrolytic cell means comprising;
   anode means comprising a first surface;
   cathode means comprising a second surface;
   means for maintaining an electrical potential between said first and second surfaces,
   means for causing said aqueous solution to flow between said first and second surfaces; and to be divided into cathode and anode streams, said anode stream comprising the portion of said electrolytic solution that was caused to flow between said first and second surfaces adjacent to said first surface and said cathode stream comprising the portion of said electrolytic solution that was caused to flow between said first and second surfaces adjacent to said second surface; and
   means for combining said anode and cathode streams to form a treated waste stream.

7. The apparatus of claim 6 further comprising UV light means for illuminating said aqueous solution with UV light.

8. A method for destroying an organic compound selected from the group consisting of Carbon Tetrachloride, Dioctylphthalate, Isooctane, Naphthalene, Pentachlorophenol, and Trichloroethylene, said method comprising the steps of:
   generating an anode stream comprising a mixture of oxidants by passing a salt solution through an electrolytic cell comprising:
   anode means comprising a first surface;
   cathode means comprising a second surface, said second surface being parallel to said first surface;
   means for maintaining an electrical potential between said first and second surfaces;
   means for causing salt solution to flow between said first and second surfaces and to be subsequently divided into cathode and anode streams, said anode stream comprising the portion of said electrolytic solution that was caused to flow between said first and second surfaces adjacent to said first surface; and mixing a portion of said anode stream with said organic compound.

* * * * *